United States Patent
Tian et al.

(10) Patent No.: US 9,031,952 B2
(45) Date of Patent: May 12, 2015

(54) METHODS AND APPARATUSES FOR USER INTEREST MODELING

(75) Inventors: Jilei Tian, Beijing (CN); Rile Hu, Beijing (CN); Wenfeng Li, Beijing (CN); Xiaojie Wang, Beijing (CN)

(73) Assignee: Nokia Corporation, Espoo (FI)

(*) Notice: Subject to any disclaimer, the term of this patent is extended or adjusted under 35 U.S.C. 154(b) by 226 days.

(21) Appl. No.: 13/519,875

(22) PCT Filed: Dec. 31, 2009

(86) PCT No.: PCT/CN2009/076355
§ 371 (c)(1),
(2), (4) Date: Jun. 28, 2012

(87) PCT Pub. No.: WO2011/079462
PCT Pub. Date: Jul. 7, 2011

(65) Prior Publication Data
US 2012/0290599 A1    Nov. 15, 2012

(51) Int. Cl.
*G06F 17/30*    (2006.01)
*G06Q 30/02*    (2012.01)

(52) U.S. Cl.
CPC .......... *G06F 17/30616* (2013.01); *G06Q 30/02* (2013.01)

(58) Field of Classification Search
CPC .................... G06F 17/30705; G06F 17/30702
See application file for complete search history.

(56) References Cited

U.S. PATENT DOCUMENTS

| 8,166,026 | B1* | 4/2012 | Sadler .......................... 707/725 |
| 2006/0218035 | A1 | 9/2006 | Park et al. |
| 2007/0118498 | A1* | 5/2007 | Song et al. ........................ 707/1 |
| 2008/0275849 | A1* | 11/2008 | Basu et al. ........................ 707/3 |

FOREIGN PATENT DOCUMENTS

| CN | 101105795 A | 1/2008 |
| CN | 100530185 | 8/2009 |
| CN | 101520878 | 9/2009 |
| JP | 2007148948 | 6/2007 |

OTHER PUBLICATIONS

Blie et al., "Latent Dirichlet Allocation" Journal of Machine Learning Research 3, 2003, pp. 993-1022.
Li et al., "Use Interest Modeling by Labeled LDA With Topic Features", 11th International Conference on Mobile Data Management, 2010, 7 pages.
Andrzejewski et al., "Latent Dirichlet Allocation With Topic-In-Set Knowledge", Proceedings of the NAACL HLT Workshop on Semi-supervised Learning for Natural Language Processing, Jun. 2009, pp. 43-48.

(Continued)

*Primary Examiner* — Anh Tai Tran
(74) *Attorney, Agent, or Firm* — Alston & Bird LLP

(57) ABSTRACT

Methods and apparatuses are provided for user interest modeling. A method may include accessing logged interactive user history data for a user data for a user. The method may additionally include determining at least one user interest topic for the user by utilizing a topic model acting upon at least a portion of the logged interactive user history data and one or more seed documents generated from a topic feature source. Corresponding apparatuses are also provided.

22 Claims, 8 Drawing Sheets

(56) References Cited

OTHER PUBLICATIONS

Maskeri et al., "Mining Business Topics in Source Code Using Latent Dirichlet Allocation", Proceedings of the 1st India Software Engineering Conference, Feb. 19-22, 2008, 8 pages.

Yao et al., "Efficient Methods for Topic Model Inference on Streaming Document Collections", Proceedings of the 15th ACM SIGKDD international conference on Knowledge Discovery and Data mining, Jun. 28-Jul. 1, 2009, pp. 937-945.

Ramage et al., "Clustering the Tagged Web(MM-LDA)", Proceedings of the International Conference on Web Search and Data Mining, 2008, 10 pages.

Canini et al., "Online Inference of Topics With Latent Dirichlet Allocation", In Proceedings of the 12th International Conference on Artificial Intelligence and Statistics, vol. 5, 2009, pp. 65-72.

Daud et al., "Exploiting Temporal Authors Interests via Temporal-Author-Topic Modeling", Advanced Data Mining and Applications, Lecture Notes in Computer Science, vol. 5678, 2009, pp. 435-443.

"Markov Chain Monte Carlo", From Wikipedia, Retrieved on Jul. 9, 2013, Webpage available at: en.wikipedia.org/wiki/Markov_chain_Monte_Carlo.

"Gibbs Sampling", From Wikipedia, Retrieved on Jul. 9, 2013, Webpage available at: http://en.wikipedia.org/wiki/Gibbs_sampling.

"Latent Dirichlet Allocation", From Wikipedia, Retrieved on Jul. 9, 2013, Webpage available at: http://en.wikipedia.org/wiki/Latent_Dirichlet_allocation.

Office Action received for corresponding Eurpoean Application No. 09852747.6-1958, dated Mar. 6, 2014, 7 pages.

Arindam Banerjee et al. "Topic Models over Text Streams; A Study of Batch and Online Unsupervised Learning", Proceedings of the SIAM International Conference on Data Mining (SDM-2007), Apr. 30, 2007, pp. 1-6, Miineapolis, USA.

International Search Report received for corresponding Patent Cooperation Treaty Application No. PCT/CN2009/076355, dated Sep. 2, 2010, 3 pages.

Written Opinion received for corresponding Patent Cooperation Treaty Application No. PCT/CN2009/076355, dated Sep. 2, 2010, 4 pages.

International Preliminary Report on Patentability received for corresponding Patent Cooperation Treaty Application No. PCT/CN2009/076355, dated Jul. 4, 2012, 5 pages.

Supplementary European Search Report and Written Opinion received for corresponding European Application No. 09852747, dated Jul. 10, 2013, 6 pages.

Arindam Banerjee et al. "Topic Models over Text Streams: A Study of Batch and Online Unsupervised learning", Proceedings of the SIAM International Conference on Data Mining (SDM-2007), Apr. 30, 2007.

Office Action for Chinese Application No. 200980163229.4 dated Sep. 16, 2014.

* cited by examiner

METHODS AND APPARATUSES FOR USER INTEREST MODELING

RELATED APPLICATION

This application was originally filed as PCT Application No. PCT/CN2009/076355 filed Dec. 31, 2009.

TECHNOLOGICAL FIELD

Embodiments of the present invention relate generally to the provision of targeted content and, more particularly, relate to methods and apparatuses for user interest modeling.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. Evolved networking technologies and computing devices facilitate accessing a wide array of content from remote content providers for consumption at a user's local computing device as well as exchanging data with other users. Content providers and network service providers often defray the costs of providing content and facilitating the exchange of data between users through advertising. In order for advertising to have the most value to advertisers and thus to enable content providers to charge a premium value for advertising space, the advertisements need to attract the interest of users that are provided with the advertisements so as to induce users to purchase advertised products and services. Accordingly, advertisers attempt to "target" advertisements to specific users.

Further, some content providers attempt to provide content targeted to user interests as a service to users. In order for targeted content provided by targeted content providers to be deemed valuable by users, the targeted content should be targeted toward user interests so as to accurately reflect the user interests. Additionally, content and/or service providers may attempt to facilitate the formation of interest groups or social networks by users having similar interests.

BRIEF SUMMARY OF SOME EXAMPLES OF THE INVENTION

Methods, apparatuses, and computer program products are herein provided for user interest modeling. In this regard, systems, methods, apparatuses, and computer program products are provided that may provide several advantages to service providers, content providers, computing devices and computing device users. Embodiments of the invention provide for the determination of user interest topics defining a user's interests. Embodiments of the invention facilitate leveraging determined user interest topics for providing targeted content, such as, for example, targeted advertising to users. In this regard, embodiments of the invention mine logged interactive user history data to determine user interest topics for a user. In accordance with some embodiments of the invention, the logged interactive user history data comprises data produced, received, and/or accessed by a user in the course of everyday use of a computing device.

As patterns of usage of a device by the user may reflect a user's interests, embodiments of the invention provide for statistical modeling of logged interactive user history data by way of a novel topic model configured to act upon one or more seed documents generated from a topic feature source. One such topic model provided by an embodiment of the invention is labeled latent Dirichlet allocation with topic feature (LLDA-TF) algorithm. In accordance with embodiments of the invention, predefined topic category labels comprising human readable and understandable names are determined through statistical modeling from logged interactive user history data. These predefined topic category labels provide more meaningful information about user interest topics than previous models, which merely provide a list of keywords representing a latent topic.

In a first example embodiment, a method is provided, which comprises accessing logged interactive user history data for a user. The method of this embodiment further comprises determining at least one user interest topic for the user utilizing a topic model acting upon at least a portion of the logged interactive user history data and one or more seed documents generated from a topic feature source.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least access logged interactive user history data for a user. The at least one memory and stored computer program code are configured to, with the at least one processor, further cause the apparatus of this embodiment to determine at least one user interest topic for the user utilizing a topic model acting upon at least a portion of the logged interactive user history data and one or more seed documents generated from a topic feature source.

In another example embodiment, a computer program product is provided. The computer program product of this embodiment includes at least one computer-readable storage medium having computer-readable program instructions stored therein. The program instructions of this embodiment comprise program instructions configured to access logged interactive user history data for a user. The program instructions of this embodiment further comprise program instructions configured to determine at least one user interest topic for the user utilizing a topic model acting upon at least a portion of the logged interactive user history data and one or more seed documents generated from a topic feature source.

In another example embodiment, an apparatus is provided that comprises means for accessing logged interactive user history data for a user. The apparatus of this embodiment further comprises means for determining at least one user interest topic for the user utilizing a topic model acting upon at least a portion of the logged interactive user history data and one or more seed documents generated from a topic feature source.

In another exemplary embodiment, a computer-readable storage medium carrying computer-readable program instructions is provided. The computer-readable program instructions comprise program instructions configured to access logged interactive user history data for a user. The computer-readable program instructions further comprise program instructions configured to determine at least one user interest topic for the user utilizing a topic model acting upon at least a portion of the logged interactive user history data and one or more seed documents generated from a topic feature source.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
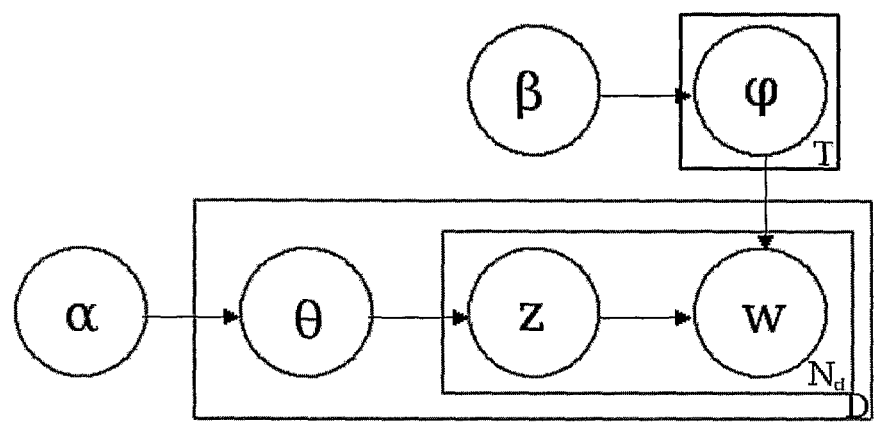
FIG. 1 illustrates a graphical representation of a latent Dirichlet allocation model.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Latent Dirichlet allocation (LDA) is a full probabilistic generative model having mathematical modeling capability. The computational complexity of LDA algorithm is not directly influenced by the quantity of training documents input into the model, making it suitable and scalable for large-scaled corpus.

FIG. 1 illustrates a graphical representation of a latent Dirichlet allocation model. In the model of FIG. 1, D is the number of documents and $N_d$ is the number of words in each document d. And T is the number of topics. $\alpha$ and $\beta$ are respective Dirichlet parameters of $\theta$ and $\phi$. $\theta$ represents per-document topic proportions. z is representative of per-word topic assignment and $\phi$ comprises topic distribution(s).

With reference to FIG. 1, the generative process for each document d in a corpus D may be represented as:
1) Choose $\theta \sim \text{Dir}(a)$
2) For each word w in d
    a) Choose a topic $z_n \sim \text{Multinomial}(\theta)$
    b) Choose a word $w_n$ from $p(w_n|z_n, \beta)$ which is a multinomial probability conditioned on the topic $z_n$.

Gibbs samples are one way used to estimate parameters of LDA model. For each Gibbs sampling iteration, the topic of each word in each document is sampled according to the posterior of $z_{di}$, that is $p(z_{di}|w, \alpha, \beta)$. Further, for each iteration, the algorithm updates $p(z_{di}|w, \alpha, \beta)$, which is used for the next iteration as the prior distribution. In the Gibbs sampling, the posterior $p(z_{di}|w, \alpha, \beta)$ is only related to the co-occurrence of the words and topics as well as the co-occurrence of the documents and topics. The function of $p(z_{di}|w, \alpha, \beta)$ is:

$$p(z_{di}|w, \alpha, \beta) = \frac{n_{z_{di}w_{di}} + \beta_{w_{di}} - 1}{\sum_{v=1}^{V}(n_{z_{di},v} + \beta_v) - 1} \times \frac{m_{d_{di},z_{di}} + \alpha_{z_{di}} - 1}{\sum_{z=1}^{T}(n_{d_{di},z} + \alpha_z) - 1}, \quad (1)$$

where, $n_{zw}$ is the number of tokens of word v and is assigned to topic z, $m_{dz}$ is the number of tokens in document d and is assigned to topic z. The posterior of $\theta$ and $\Phi$ are then updated using:

$$\theta_{dz} = \frac{m_{dz} + \alpha}{\sum_{z=1}^{T} m_{dz} + \alpha T} \quad (2)$$

$$\varphi_{zw} = \frac{n_{zw} + \beta}{\sum_{w=1}^{V} n_{zw} + \beta V}, \quad (3)$$

where, T is the number of topics, and V is the size of the vocabulary. In this regard, the posterior of $\theta$ and $\Phi$ may be updated after the sampling process.

LDA is limited in that it can not directly output topic information but only a list of keywords that represent a latent topic that may not align to human defined or understandable topic, thus inhibiting the ability to analyze and leverage user interests. Moreover, the keywords representing a topic the algorithm finally decodes represent the latent state, which is generally not readable or understandable in a meaningful way by humans.

Embodiments of the invention provide new topic models and methods, apparatuses, and computer program products using the new topic models for user interest modeling that may overcome some of the deficiencies in LDA and other topic models. The topic models provided by some embodiments of the invention are configured to act upon one or more seed documents generated from a topic feature source (e.g., seed documents including topic feature(s) and/or indications thereof). Some embodiments of the invention provide for an improved LDA model, referred to herein as LLDA-TF (labeled latent Dirichlet allocation with topic feature). It will be appreciated, however, that LLDA-TF is merely an example of one embodiment of a topic model configured to utilize topic features in accordance with embodiments of the invention. Accordingly, it will be appreciated that where use of LLDA-TF is described, the description is provided as an example of one topic model configured to use topic features in accordance with embodiments of the invention. Accordingly, the invention contemplates any topic model configured to act upon one or more seed documents generated from a topic feature source as described further below and not just LDA-based topic models.

Figure 2:
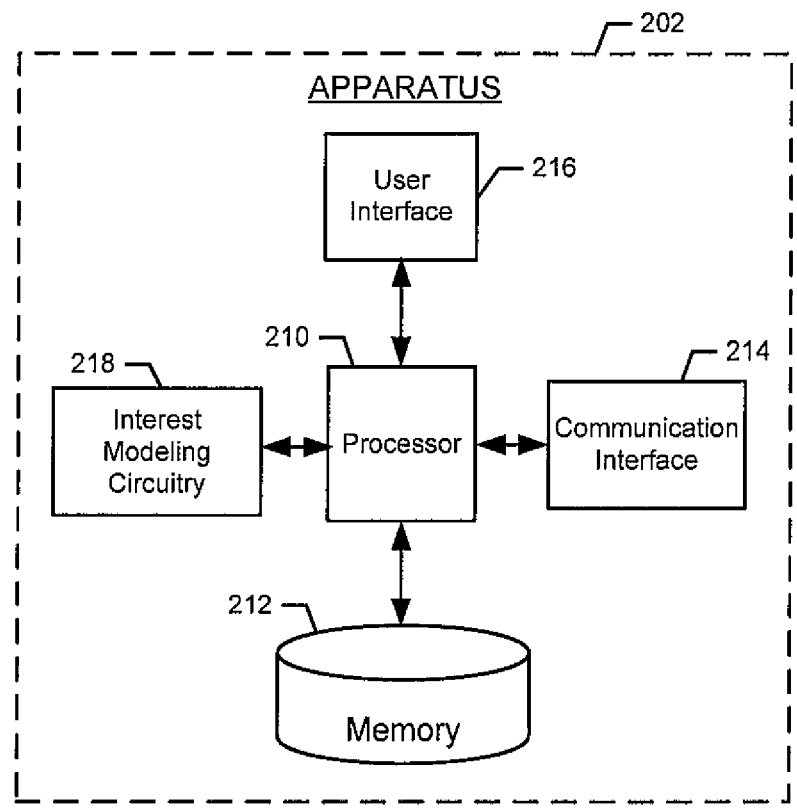
FIG. 2 illustrates a block diagram of an apparatus for user interest modeling according to an example embodiment of the present invention.

FIG. 2 illustrates a block diagram of an apparatus 202 for user interest modeling according to an example embodiment of the present invention. In this regard, FIG. 2 illustrates an apparatus that may be configured to determine at least one user interest topic for a user by utilizing a topic model, such as, for example, LLDA-TF, as further described below. It will be appreciated that the apparatus 202 is provided as an example of one embodiment of the invention and should not be construed to narrow the scope or spirit of the invention in any way. In this regard, the scope of the invention encompasses many potential embodiments in addition to those illustrated and described herein. As such, while FIG. 2 illustrates one example of a configuration of an apparatus for user interest modeling, numerous other configurations may also be used to implement embodiments of the present invention.

The apparatus 202 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, user terminal (e.g., the user terminal 402 illustrated in FIG. 4), targeted content provider (e.g., the targeted content provider 406 illustrated in FIG. 4), any combination thereof, and/or the like. In an example embodiment, the apparatus 202 is embodied as a mobile terminal, such as that illustrated in FIG. 3.

Figure 3:
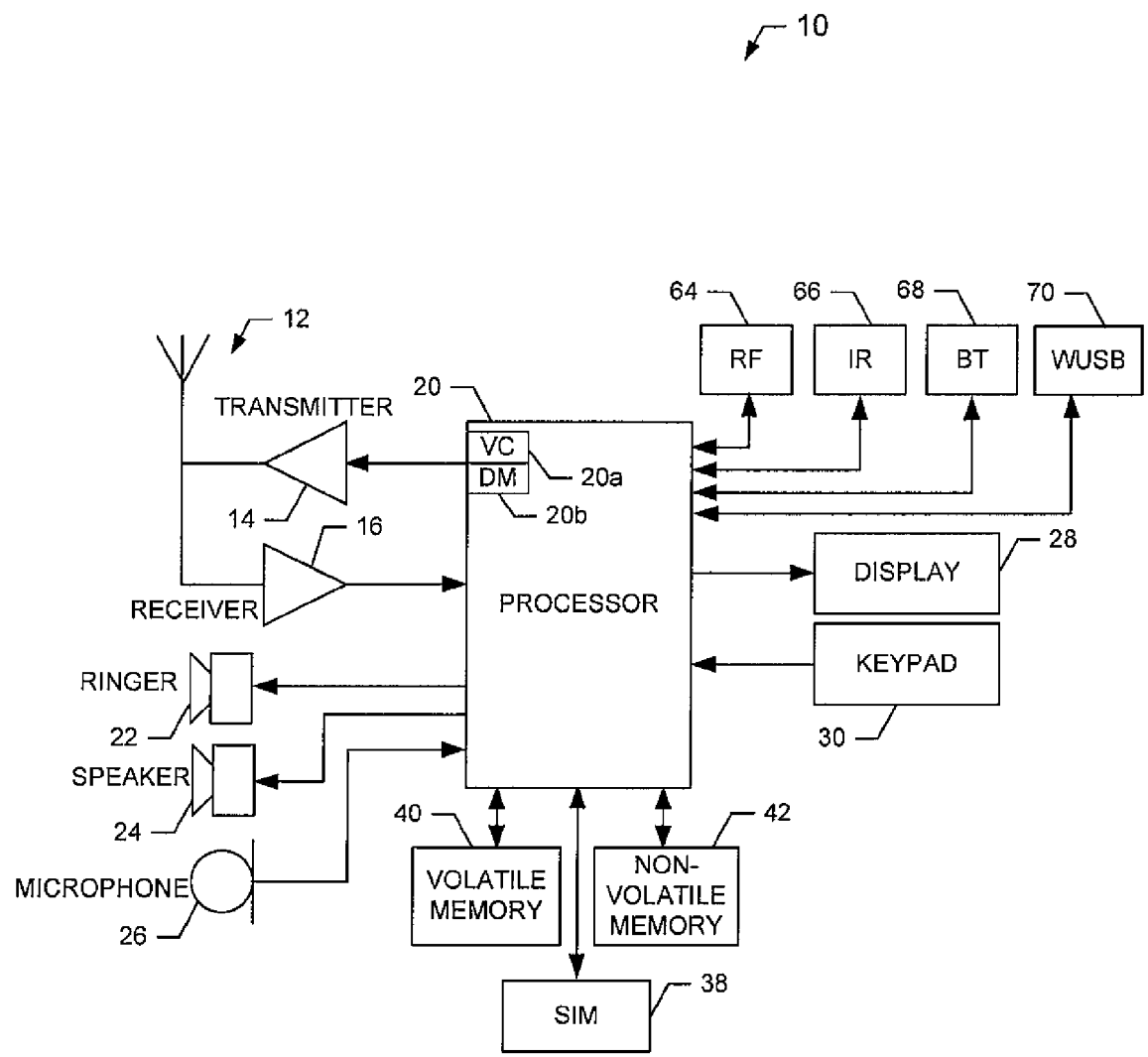
FIG. 3 is a schematic block diagram of a mobile terminal according to an example embodiment of the present invention.

In this regard, FIG. 3 illustrates a block diagram of a mobile terminal 10 representative of one embodiment of an apparatus 202 in accordance with embodiments of the present invention. It should be understood, however, that the mobile terminal 10 illustrated and hereinafter described is merely illustrative of one type of apparatus 202 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 2, in an example embodiment, the apparatus 202 includes various means, such as a processor 210, memory 212, communication interface 214, user interface 216, and interest modeling circuitry 218 for performing the various functions herein described. These means of the apparatus 202 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 212) that is executable by a suitably configured processing device (e.g., the processor 210), or some combination thereof.

The processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 210 comprises a plurality of processors. The plurality of processors may be in operative communication with each other and may be collectively configured to perform one or more functionalities of the apparatus 202 as described herein. The plurality of processors may be embodied on a single computing device or distributed across a plurality of computing devices collectively configured to function as the apparatus 202. In embodiments wherein the apparatus 202 is embodied as a mobile terminal 10, the processor 210 may be embodied as or comprise the processor 20. In an example embodiment, the processor 210 is configured to execute instructions stored in the memory 212 or otherwise accessible to the processor 210. These instructions, when executed by the processor 210, may cause the apparatus 202 to perform one or more of the functionalities of the apparatus 202 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein.

The memory 212 may comprise, for example, volatile memory, non-volatile memory, or some combination thereof. Although illustrated in FIG. 2 as a single memory, the memory 212 may comprise a plurality of memories. The plurality of memories may be embodied on a single computing device or may be distributed across a plurality of computing devices collectively configured to function as the apparatus 202. In various embodiments, the memory 212 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 202 is embodied as a mobile terminal 10, the memory 212 may comprise the volatile memory 40 and/or the non-volatile memory 42. The memory 212 may be configured to store information, data, applications, instructions, or the like for enabling the apparatus 202 to carry out various functions in accordance with example embodiments of the present invention. For example, in at least some embodiments, the memory 212 is configured to buffer input data for processing by the processor 210. Additionally or alternatively, in at least some embodiments, the memory 212 is configured to store program instructions for execution by the processor 210. The memory 212 may store information in the form of static and/or dynamic information. The stored information may include, for example, logged interactive user history data. This stored information may be stored and/or used by interest modeling circuitry 218 during the course of performing its functionalities.

The communication interface 214 may be embodied as any device or means embodied in circuitry, hardware, a computer program product comprising computer readable program instructions stored on a computer readable medium (e.g., the memory 212) and executed by a processing device (e.g., the processor 210), or a combination thereof that is configured to receive and/or transmit data from/to an entity. For example, the communication interface 214 may be configured to communicate with a user terminal 402 and/or targeted content provider 406 over the network 404 illustrated in FIG. 4. In at least one embodiment, the communication interface 214 is at least partially embodied as or otherwise controlled by the processor 210. In this regard, the communication interface 214 may be in communication with the processor 210, such as via a bus. The communication interface 214 may include, for example, an antenna, a transmitter, a receiver, a transceiver and/or supporting hardware or software for enabling communications with one or more remote computing devices. The communication interface 214 may be configured to receive and/or transmit data using any protocol that may be used for communications between computing devices. In this regard, the communication interface 214 may be configured to receive and/or transmit data using any protocol that may be used for transmission of data over a wireless network, wireline network, some combination thereof, or the like by which the apparatus 202 and one or more remote computing devices are in communication. The communication interface 214 may additionally be in communication with the memory 212, user interface 216, and/or interest modeling circuitry 218, such as via a bus.

The user interface 216 may be in communication with the processor 210 to receive an indication of a user input and/or to provide an audible, visual, mechanical, or other output to a user. As such, the user interface 216 may include, for example, a keyboard, a mouse, a joystick, a display, a touch screen display, a microphone, a speaker, and/or other input/output mechanisms. In embodiments wherein the apparatus 202 is embodied as one or more servers, aspects of the user interface 126 may be reduced or the user interface 126 may even be eliminated. The user interface 216 may be in communication with the memory 212, communication interface 214, and/or interest modeling circuitry 218, such as via a bus.

The interest modeling circuitry 218 may be embodied as various means, such as circuitry, hardware, a computer program product comprising computer readable program instructions stored on a computer readable medium (e.g., the memory 212) and executed by a processing device (e.g., the processor 210), or some combination thereof and, in one embodiment, is embodied as or otherwise controlled by the processor 210. In embodiments wherein the interest modeling circuitry 218 is embodied separately from the processor 210, the interest modeling circuitry 218 may be in communication with the processor 210. The interest modeling circuitry 218 may further be in communication with one or more of the memory 212, communication interface 214, or user interface 216, such as via a bus.

Figure 4:
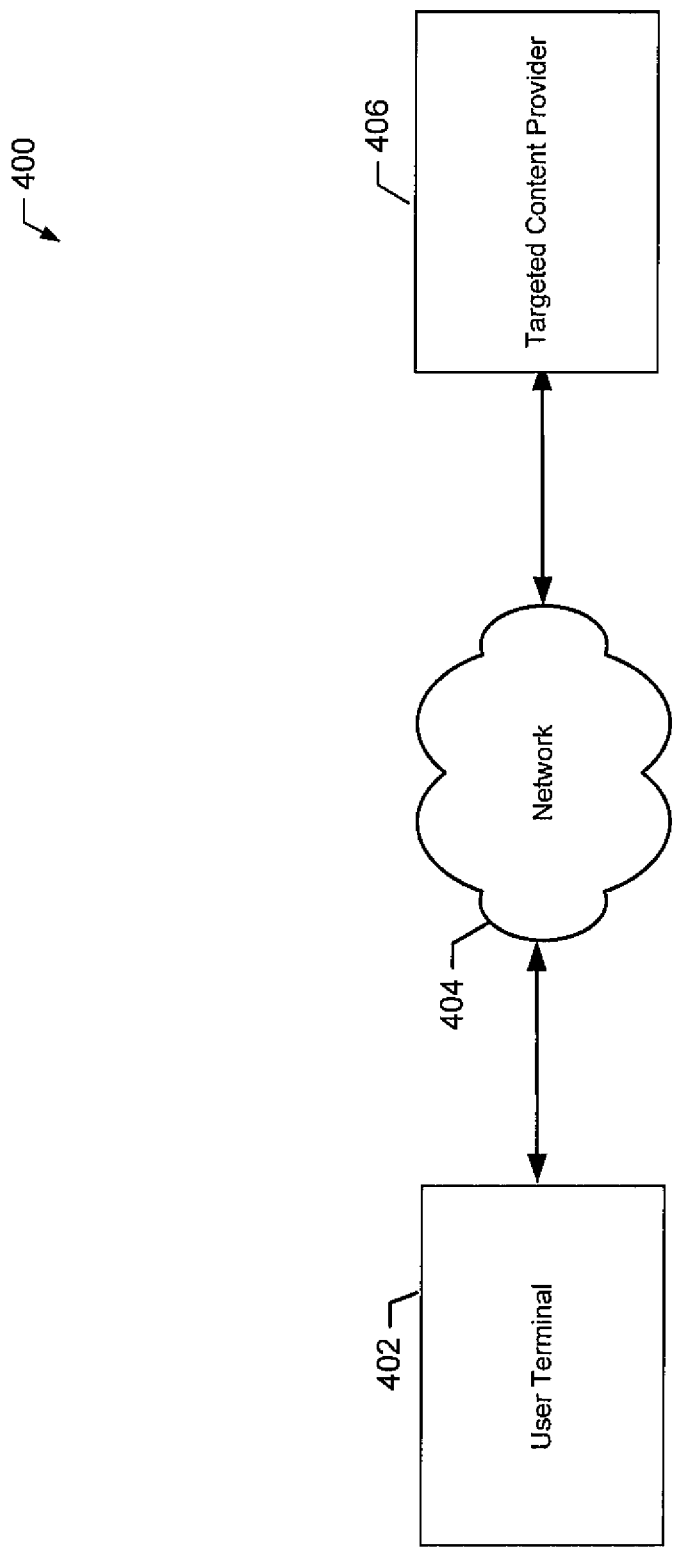
FIG. 4 illustrates a system for providing targeted content according to an example embodiment of the present invention.

FIG. 4 illustrates a system 400 for providing targeted content according to an example embodiment of the present invention. The system 400 comprises one or more user terminals 402 and one or more targeted content providers 406 in communication with each other via the network 404. The network 404 may comprise a wireless network (e.g., a cellular network, wireless local area network, wireless personal area network, wireless metropolitan area network, and/or the like), a wireline network, or some combination thereof, and in some embodiments comprises the internet.

A user terminal 402 may comprise any computing device used by a user to access content, such as web pages, and/or engage in communications with other user terminals (e.g., communication via email, text messaging, instant messaging, and/or the like) over the network 404. The user terminal 402 may comprise, for example, a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, or the like.

A targeted content provider 406 may comprise any computing device or plurality of computing devices configured to provide content targeted to the interests of a user of a user terminal to a user terminal 402 such that the user of the user terminal 402 is enabled to view and/or interact with the targeted content. In this regard, the targeted content provider 406 may comprise, for example, a desktop computer, laptop computer, mobile terminal, mobile computer, mobile phone, mobile communication device, one or more servers, one or more network nodes, game device, digital camera/camcorder, audio/video player, television device, radio receiver, digital video recorder, positioning device, any combination thereof, or the like.

The targeted content provided by a target content provider 406 may include, for example, advertising content. It will be appreciated, however, that targeted content is not limited to advertisements, but may comprise any content or other data that is selected and targeted toward a user's interests. The user terminal 402 may accordingly be configured to receive targeted content provided by the targeted content provider 406 over the network 404 and present the received targeted content to a user of the user terminal 402.

In some embodiments, the user terminal 402 comprises an apparatus 202. In such embodiments, the user terminal 402 may be configured to log interactive user history data. The interactive user history data may describe a user's interactions with and use of the user terminal 402. In this regard, the interactive user data may comprise, for example, web pages visited by the user, emails sent by the user, emails received by the user, text messages sent by the user, text messages received by the user, documents viewed by the user, documents edited by the user, instant messages sent by the user, instant messages received by the user, user-device interactive data, user's dynamic context information, and/or the like. The user terminal 402 may be configured to determine at least one user interest topic based on the logged interactive user history data using a topic model, such as, for example, LLDA-TF, as described further herein below. The user terminal 402 may provide determined user interest topics to the targeted content provider 406 such that the targeted content provider may select targeted content targeted to the user's interests as indicated by the determined user interest topics and provide the targeted content to the user terminal 402. Since the targeted content provider 406 may not have access to interactive user history data, such embodiments may protect confidentiality of user data.

In alternative embodiments, the targeted content provider 406 comprises the apparatus 202. In such embodiments, the targeted content provider 406 may be configured to receive and/or otherwise determine usage data regarding a user's interactive use of the user terminal 402. The usage data may comprise, for example, web pages visited by the user, emails sent by the user, emails received by the user, text messages sent by the user, text messages received by the user, documents viewed by the user, documents edited by the user, instant messages sent by the user, instant messages received by the user, user-device interactive data, user's dynamic context information, and/or the like. The targeted content provider 406 may be configured to log the usage data as interactive user history data. The targeted content provider 406 may be further configured to determine at least one user interest topic based on the logged interactive user history data using a topic model, such as, for example, LLDA-TF, as described further herein below. The targeted content provider may be further configured to select targeted content targeted to the user's interests as indicated by the determined user interest topics and provide the targeted content to the user terminal 402.

Referring again to FIG. 2, the interest modeling circuitry 218 is configured in some embodiments to access logged interactive user history data for a user. In this regard, the interest modeling circuitry 218 may, for example, be configured to access logged interactive user history data from the memory 212, from a user terminal 402, and/or the like. The logged interactive user history data may comprise, for example, web pages visited by the user, emails sent by the user, emails received by the user, text messages sent by the user, text messages received by the user, documents viewed by the user, documents edited by the user, instant messages sent by the user, instant messages received by the user, user-device interactive data, user's dynamic context information, and/or the like. The interest modeling circuitry 218 is further configured in some embodiments to determine at least one user interest topic for a user by inputting at least a portion of the logged interactive user data into a topic model configured to act upon the logged interactive user data. This topic model may, for example, comprise an embodiment of the LLDA-TF algorithm further described below. A determined user interest topic may comprise a predefined topic category label. The topic category label may comprise a human readable name of a user interest topic. In this regard, a topic category label may provide meaning on the topic which it labels. For example, a topic category label may comprise, for example, "information technology." Such a topic category label contrasts with the mere list of keywords representative of a latent topic that may be output by LDA.

Figure 5:
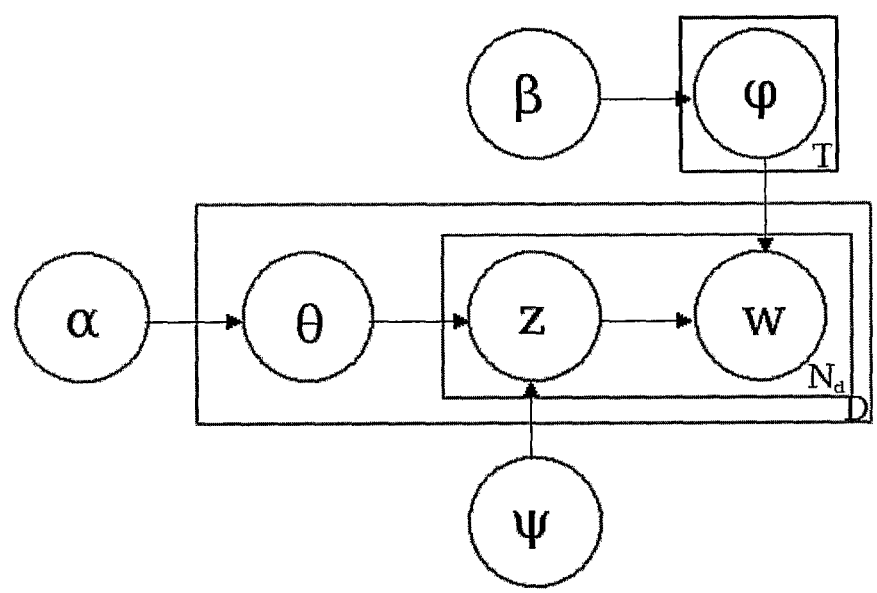
FIG. 5 illustrates a graphical representation of a labeled latent Dirichlet allocation with topic feature model according to an example embodiment of the invention.

Referring now to FIG. 5, FIG. 5 illustrates a graphical representation of a labeled latent Dirichlet allocation with topic feature model that may be implemented by the interest modeling circuitry 218 according to an example embodiment of the invention. The notation used in FIG. 5 is generally the same as used in the LDA model illustrated in FIG. 1. However, the LLDA-TF model additionally includes the additional component of topic features (TF), labeled in FIG. 5 as ψ, compared with LDA model. In this regard yr serves as an influence factor of the topic features and/or seed documents comprising the topic features. In this regard, topic models, including LLDA-TF, provided by embodiments of the invention are configured to act upon topic features that may, for example, be included in one or more seed documents generated from a topic feature source. Use of topic features, as described further below, may improve normal LDA and/or other conventional topic models in several ways. In this regard, topic features give each topic a label (e.g., a topic category label), which help to identify the name of each topic. Further, usage of topic features as further described below may be helpful in getting a better topic cluster.

LLDA-TF and other topic models provided by embodiments of the invention use topic features as prior knowledge of different topics. For example, topic models provided by embodiments of the invention may be configured to act upon topic feature keywords and/or seed documents comprising topic feature keywords. These topic feature keywords and/or seed documents comprising topic feature keywords may be utilized by topic models provided by embodiments of the invention as prior knowledge of a topic. In this regard, a seed document may comprise one or more topic features (e.g., topic feature keywords) associated with the user interest topic with which the seed document is associated. The interest modeling circuitry 218 may be configured to abstract topic features from a topic feature source. The topic feature source may comprise any source of content documents having titles and associated text or other data. In this regard, a topic feature source may comprise, for example, an online or electronic encyclopedia, dictionary, and/or the like. In an example embodiment, the topic feature source comprises Wikipedia. Embodiments of the invention will be further described with reference to Wikipedia as an example topic feature source. However, it will be appreciated that this description is by way of example and not by way of limitation. Accordingly, where use of Wikipedia is referenced it will be appreciated that other topic feature sources may be used in addition to or in lieu of Wikipedia.

Example pseudo-code for abstracting topic features from Wikipedia is as follows:

```
1: for each topic t
2:     Keyword w[ ]
3:     wikipages wp=""
4:     w[0] = get_tag(t)
5:     while not get enough keywords
6:         for each wiki in wikipedia
7:             title = get_title(wiki)
8:             for each word in title
9:                 if w.contains(word)
10:                    wp += wiki
11:                endif
12:            end loop
13:        end loop
14:        w = extract_keywords(wp)
15:        wp = ""
16:    end loop
17:    save_keywords(t, w)
18: end loop
```

The abstraction process may begin with a list of user interest topics with which an entity operating a service provider, content provider, the apparatus 202, and/or the like is concerned. For each user interest topic, the interest modeling circuitry 218 may iteratively extract the keywords from Wikipedia. For each iteration, the interest modeling circuitry 218 may use the keywords that are obtained from the previous iteration to generate new keywords. Given the vast amount of content in Wikipedia, the interest modeling circuitry 218 may only consider titles of articles within Wikipedia when identifying articles of relevance to a user interest topic of concern. However, in some embodiments, the interest modeling circuitry 218 may consider the titles and contents of articles. The abstraction process may additionally have a condition to end the process so as to avoid infinite extraction of topic features from the topic feature source.

The abstraction process may generate a series of topic feature words for each user interest topic to be used in a topic model, such as, for example, LLDA-TF. In this regard, the interest modeling circuitry 218 may be configured, in performing an abstraction process, to generate a seed document for each user interest topic of concern. A seed document may have a user interest topic name at least partially defined by a title of a content document (e.g., article) accessed from the topic feature source (e.g., Wikipedia). A seed document may further comprise topic feature keywords corresponding to keywords extracted from the accessed content document. The generated seed documents may be used by the interest modeling circuitry 218 as input to the LLDA-TF algorithm.

Topic features (e.g., seed documents and/or topic feature keywords contained within seed documents) may be used by the interest modeling circuitry 218 in statistical Gibbs sampling. It will be appreciated, however, that Gibbs sampling is provided as one example of a statistical sampling method that may be used and other appropriate sampling methods or algorithms are contemplated within the scope of the invention and may be substituted for Gibbs sampling. Alternative sampling methods that may be used in lieu of Gibbs sampling include, for example, other Markov chain Monte Carlo methods including, but not limited to, various random walk Monte Carlo methods (e.g., Metropolis-Hastings algorithm, Slice sampling, Multiple-try Metropolis algorithm, and/or the like). Further, in some embodiments, various Bayesian inference techniques, such as, for example, variational Bayes approximation methods, expectation propagation, and/or the like may be used in addition to or in lieu of Gibbs sampling. Accordingly, where Gibbs sampling is referred to herein, it is provided by way of example and not by way of limitation. This usage of topic features in an embodiment of the invention using an LLDA-TF topic model is illustrated in FIG. 6, which illustrates a graphical representation of inputs and outputs of a labeled latent Dirichlet allocation with topic feature model according to an example embodiment of the invention.

Figure 6:
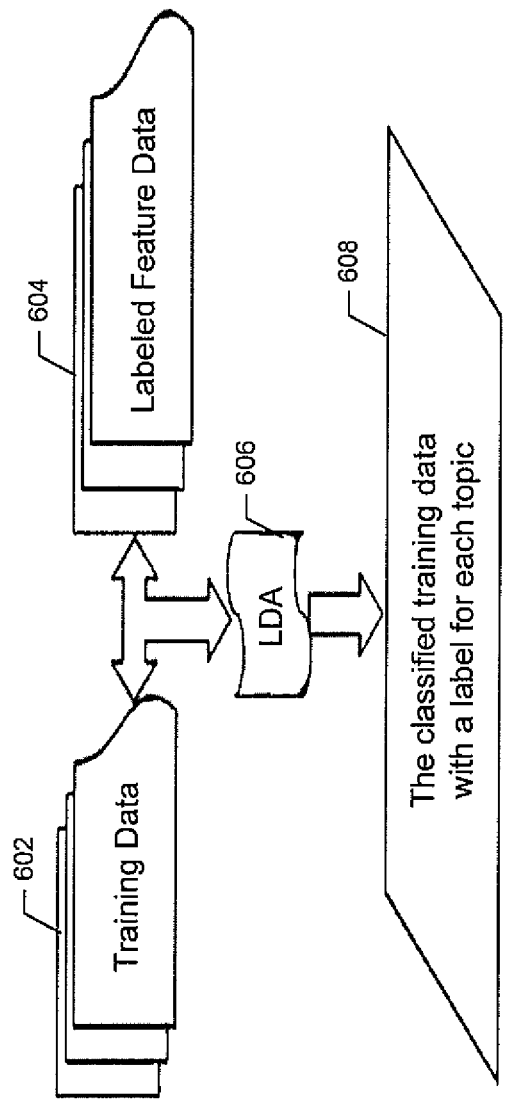
FIG. 6 illustrates a graphical representation of inputs and outputs of a labeled latent Dirichlet allocation with topic feature model according to an example embodiment of the invention.

As illustrated in FIG. 6, training data 602 (e.g., interactive user history data) and labeled feature data 604 (e.g., seed documents) are mixed together and input into the LLDA-TF algorithm 606 in order to obtain the classified data 608 having a label for each determined user interest topic. The interest modeling circuitry 218 may fix each piece of feature data (e.g., seed) to a topic with a probabilistic during the procedure of sampling. Accordingly, LLDA-TF may use the posterior of $p(z_{di}|w, \alpha, \beta)$ rather than the one used in LDA.

This posterior may be represented as follows:

$$p(z_{di} | w, \alpha, \beta) = \begin{cases} F(z_d) & \text{if } d \text{ is a seed} \\ \dfrac{n_{z_{di}, w_{di}} + \beta_{w_{di}} - 1}{\sum_{v=1}^{V}(n_{z_{di}, v} + \beta_v) - 1} \times \\ \dfrac{m_{d_{di}, z_{di}} + \alpha_{z_{di}} - 1}{\sum_{z=1}^{T}(n_{d_{di}, z} + \alpha_z) - 1} & \text{otherwise} \end{cases} \quad (4)$$

The posterior in formula (4) includes two parts. The first part is the same as LDA for the training data (e.g., interactive user history data). The second part uses a predefined probability for the seed pages in accordance with embodiments of LLDA-TF algorithm as defined herein.

The interest modeling circuitry 218 may be configured, for each user interest topic, to use its topic feature keywords as an independent input seed document in the Gibbs sampling procedure. The interest modeling circuitry 218 may predefine a same distribution for the topic feature keywords in this seed document prior to performing the Gibbs sampling procedure. The interest modeling circuitry 218 may assign topic feature keywords belonging to different topics with different distributions. Through the whole iteration process, the distributions of these words are not changed. The topic features may thus influence the sampling procedure.

When sampling the topic of each word the interest modeling circuitry 218 may determine which function from formula (4) to use. The interest modeling circuitry 218 may make the determination of which function from formula (4) to use based on whether the document in which the word from is a seed or not. After completing the Gibbs sampling procedure, the interest modeling circuitry 218 may update θ and φ using formulas (2) and (3).

In one embodiment, the interest modeling circuitry 218 is configured to perform the Gibbs sampling procedure as follows:

1) For every user interest topic of concern, abstract the seed pages from Wikipedia. Suppose the number of seed pages is NS.
2) Mix these seed pages to interactive user history data (e.g., browsing history data). Assign topic feature keywords of seed pages to a predefined user interest topic with a probabilistic P % (generally a high probabilistic, such as, for example 95% or more) and to each of the remaining user interest topics with a percentage defined by an equal distribution of 1-P % among the other user interest topics.

3) Set the number of topics to be T, where T>=NS, and run LDA. The extra (TNS) topics are used for the topics that the training documents include but are not considered topics of concerned.
4) Use Gibbs Sampling to evaluate the posterior distribution of topics.
5) During the procedure of Gibbs Sampling, the topics of the words in the training documents (e.g., interactive user history data) are sampled in each iteration according to the posterior distribution of the topics. The topics of the seed documents are only changed according to the predefined distribution of seeds, which is P %.
6) After a certain number of iteration, the program stops and the resulting determined user interest topic(s) are determined.

Example pseudo code for Gibbs sampling of LLDA-TF in accordance with an example embodiment of the invention is as follows:

```
1:  Page [ ] p_seed
2:  int N_seed = Init_seeds(p_s);
3:  Page [ ] p_doc
4:  int N_doc = Load_Documents(p_doc);
5:  Page [ ] p_all = p_s + p_train
6:  for iter = 1 to N do
7:      for d = 1 to N_seed+N_doc do
8:          for w = 1 to words do
9:              if d > N_seed
10:                 tdw = sample(p(zdw |w, α, β))
11:                 //tdw is the topic of word w in document d
12:             else
13:                 tdw = sample(p(d))
14:                 // p(d) is the predefined distribution of document d
15:             endif
16:         end loop
17:     end loop
18:     update p(zdw |w, α, β)
19: end loop
20: compute the posterior estimates of θ and φ
```

In one embodiment, the determined user interest topics comprise those user interest topics determined as being associated with greater than a predefined threshold number or percentage of user history documents (e.g., visited web pages, text messages, emails, user context entries, other documents, and/or the like). For example, given user interest topics A, B, and C and 100, out of 100 history documents, 90 history documents may be associated with topic A, 75 history documents may be associated with topic B, and 5 history documents may be associated with topic C. The predefined threshold number may, for example, comprise 50 user history documents. Accordingly, in such a scenario, the interest modeling circuitry 218 may determine topics A and B, while discarding topic C. In another example, a threshold percentage of history documents may be set at 25%. Again, the interest modeling circuitry 218 may determine topics A and B, which are associated with more than 25% of the history documents, while discarding topic C, which is associated with less than 25% of the history documents.

In some embodiments the interest modeling circuitry 218 is configured to extract relevant data from the logged interactive user history data and to input the extracted relevant data into the LLDA-TF algorithm and/or other topic model rather than all of the raw interactive user history data. The interest modeling circuitry 218 may be configured to extract relevant data by extracting text from a region of a user history document having a text density satisfying a predefined threshold density requirement. In this regard, the interest modeling circuitry 218 may calculate a text density of a region of a user history document contained in the logged interactive user history data. If the text density of the region is greater than or equal to a predefined threshold density requirement, the interest modeling circuitry 218 may extract the text of the region as relevant data for inputting into the LLDA-TF algorithm. Otherwise, the interest modeling circuitry 218 may ignore or remove the text of the region.

For example, a user history document contained in the logged interactive user history data may comprise a web page. The raw web page may be represented in html format. In addition to html tags defined in the web page, the web page may also include some content that is not related to the topic of the web page, such as, for example, advertisements, links, and/or other unrelated information. According to an example embodiment, extraction of only relevant data may be performed by the interest modeling circuitry 218 as follows:
1) The text density of each line (or other region) of a user history document is calculated. If this density reaches a threshold, the texts part of this line (or other region) are extracted.
2) The text density of the user history document is calculated to determine whether the page contains enough useful information. If the user history document text density does not meet a threshold, the user history document is eliminated from consideration and is not used as a basis for a seed document.

Example pseudo code for extracting relevant data from a web page based on text density in accordance with an example embodiment of the invention is as follows:

```
1: For each URL
2:     WebPage p = crawl(URL)
3:     texts = ""
4:     useful_texts = ""
5:     title = parse_title(p)
6:     for each line ln in p
7:         text_ln = remove_html_script(ln)
8:         density = strlen(text)/strlen(ln)
9:         texts += text_ln
10:        if(density>threshold)
11:            useful_texts += text_ln
12:        endif
13:    end loop
14:    page_density = strlen(useful_texts)/strlen(p)
15:    if(page_density > page_threshold)
16:        save_page(URL, title*5+useful_texts)
17:    endif
18: end loop
```

As a further example, the interest modeling circuitry 218 may be configured to ignore or remove advertising content in web pages visited by the user while extracting non-advertising content. The interest modeling circuitry 218 may additionally or alternatively be configured to ignore or remove navigational content contained in a web page that is not related to the content of the web page itself.

In order to test the performance of an embodiment of the LLDA-TF algorithm, an evaluation was conducted wherein user web browsing history was collected from 11 users, each of whom was assigned 3 user interest topics potentially reflected in the browsing histories. As some of the users may have the same interests than others, 27 user interest topics were used in total. These 27 user interest topics were given in URL format and the web pages were processed first. The example of the interest information is shown in Table I.

In order to enhance the merit of the experimental results, the web pages were reorganized. Further, a virtual person was assumed to have 10 user interest topics, as listed in Table II.

TABLE I

27 CATEGORIES OF USER'S INTERESTS

| Categories | Interests |
|---|---|
| IT | Cpp. Java, JavaScript, Web Run Time, Linux, agile processes, signal processing |
| Sports | marathon, basketball, football, jogging, floor ball, cricket |
| Music | Beatles, Indian music |
| Travelling | Vancouver, Helsinki, Australia |
| Entertainment | Poker, computer games, flight simulator, chess, remote control plane |
| Others | Handgun, advertising, airplane, leadership |

TABLE II

10 INTERESTS OF THE VIRTUAL PERSON

| Categories | Interests |
|---|---|
| IT | Java, agile processes |
| Sports | floor ball |
| Music | Beatles |
| Travelling | Vancouver, Helsinki |
| Entertainment | computer games |
| Others | Advertising, handguns, airplane |

In order to compare the performance of LDA to LLDA-TF, two measures were used for quantitative comparisons. Symbols used for these quantitative comparisons are defined as follows:

For an annotation corpus D having M classes of documents, the classes are marked as $C_1, C_2, \ldots, C_M$.

The topics determined from LDA are marked as $t_1, t_2, t_K$, where K is the number of topics.

The number of documents included in $C_i$ is $N_{C_i}$, while the number of the documents in topic $t_j$ is $N_{t_j}$.

The number of documents that fall into both class $C_i$ and topic $t_j$ is $N_{t_j C_i}$, and $N_{t_j C_i} = N_{C_i t_j}$ A first measure of quantitative comparison is Degree of Concentration (DC), which is defined by Equation (5) as:

$$G_\pi(D) = \frac{\sum_{C_i} \lambda_{C_i} g(C_i)}{\sum_{C_i} \lambda_{C_i}}, \quad (5)$$

where, $\pi$ is the strategy that is adopted, $$\lambda_{C_i} = \frac{N_{C_i}}{\sum_{C_i} N_{C_i}} \quad (6)$$

$$g(C_i) = -\sum_{t_j} \left( \frac{N_{C_i t_j}}{N_{C_i}} \log \frac{N_{C_i t_j}}{N_{C_i}} \right) \quad (7)$$

DC provides an indication of how well the documents belonging to a same topic are assigned with a same user interest topic label by the model. For a topic, the smaller the DC is, the better the performance is.

Figure 7:
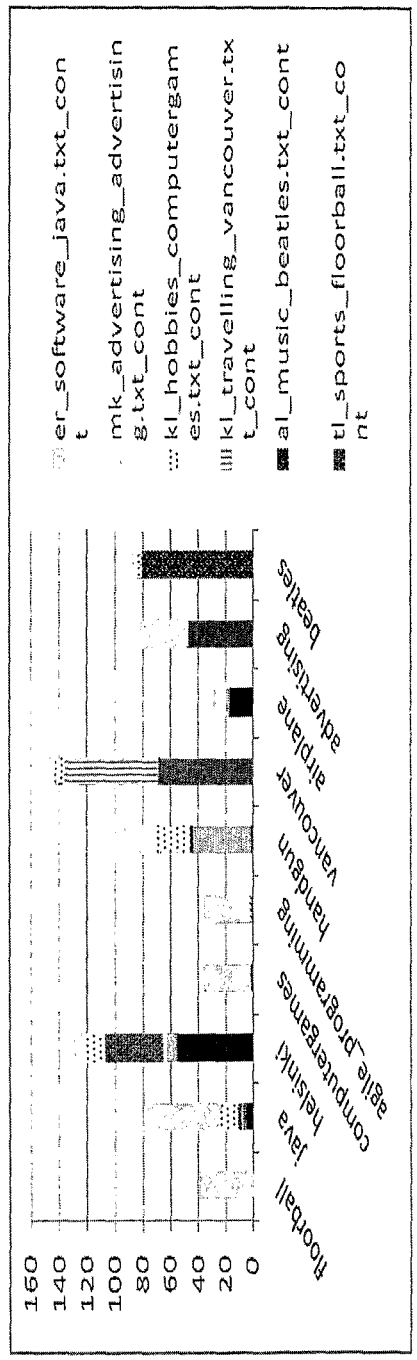
FIG. 7 illustrates a bar graph showing assignment of input documents to user interest topics by an example embodiment of the invention.

The second measure of quantitative comparison is Degree of Divergence (DD), which provides an indication of how well the documents from different classes are assigned with a specific user interest topic label by the model. For a topic, the smaller the DD is, the better the performance is. The formula of DD is:

$$H_\pi(D) = \frac{\sum_{t_j} \lambda_{t_j} h(t_j)}{\sum_{t_j} \lambda_{t_j}}, \quad (8)$$

where $\lambda_{t_j} = \frac{N_{t_j}}{\sum_{t_j} N_{t_j}} \quad (9)$ and $h(t_j) = -\sum_{C_i} \left( \frac{N_{t_j C_i}}{N_{t_j}} \log \frac{N_{t_j C_i}}{N_{t_j}} \right) \quad (10)$ In order to determine the user interest topics of the virtual person discussed above, 27 seed pages were extracted from Wikipedia web pages whose titles are the user interest topics defined in Table I. The topic keywords were extracted from these 27 seed pages. Each list of keywords was used as a seed data in LLDA-TF learning phase. The results of LLDA-TF with 10 topics are shown in FIG. 7, which illustrates a bar graph showing assignment of input documents to user interest topics by an example embodiment of the invention. In the bar graph of FIG. 7, the X-axis represents the number of topics that were defined, and the Y-axis denotes the number of documents assigned to each of interest topic. Each unique bar shading stands for a class of tagged web pages.

The experimental results comparing the performance of LDA and LLDA-TF for the 10 topics discussed above as well as for 15 topics and 27 topics, respectively are illustrated in Table III below. As indicated in table III, LLDA-TF outperformed LDA in terms of both DC and DD metrics for the 10 topic, 15 topic, and 27 topic cases.

TABLE III

SUMMARY OF THE RESULTS USING DC AND DD AS MEASURES

| | DC | | DD | |
|---|---|---|---|---|
| | LDA | LLDA-TF | LDA | LLDA-TF |
| 10 topics | 0.808773 | 0.819367 | 0.904353 | 0.880066 |
| 15 topics | 0.907747 | 0.857627 | 0.702044 | 0.615373 |
| 27 topics | 1.348299 | 1.212436 | 0.522422 | 0.405789 |

In some embodiments, the interest modeling circuitry 218 is further configured to utilize determined user interest topics to select targeted content targeted to a user's interests based at least in part upon one or more determined user interest topics. The targeted content may, for example, comprise advertising content. However, it will be appreciated that the targeted content may additionally or alternatively comprise non-advertising content that is targeted toward user interests. In one example, the targeted content may comprise informative content, news content, and/or the like that is targeted toward determined user interest topics. As another example, the targeted content may comprise recommended interest groups, social networking groups, and/or the like for a user that is targeted toward the determined user interest groups. In this regard, users having similar interests may form an interest group or belong to a social network. Accordingly, targeted content may comprise a recommendation of an interest group, social network, or the like to a user. Thus content and/or service providers may utilize determined user interest topics to facilitate building social networks comprising members having similar interests, behavior, and/or the like. The interest modeling circuitry 218 may additionally be configured to provide the targeted content to a user, such as, for example, by providing the targeted content to a user terminal 402 and/or a user thereof.

Figure 8:
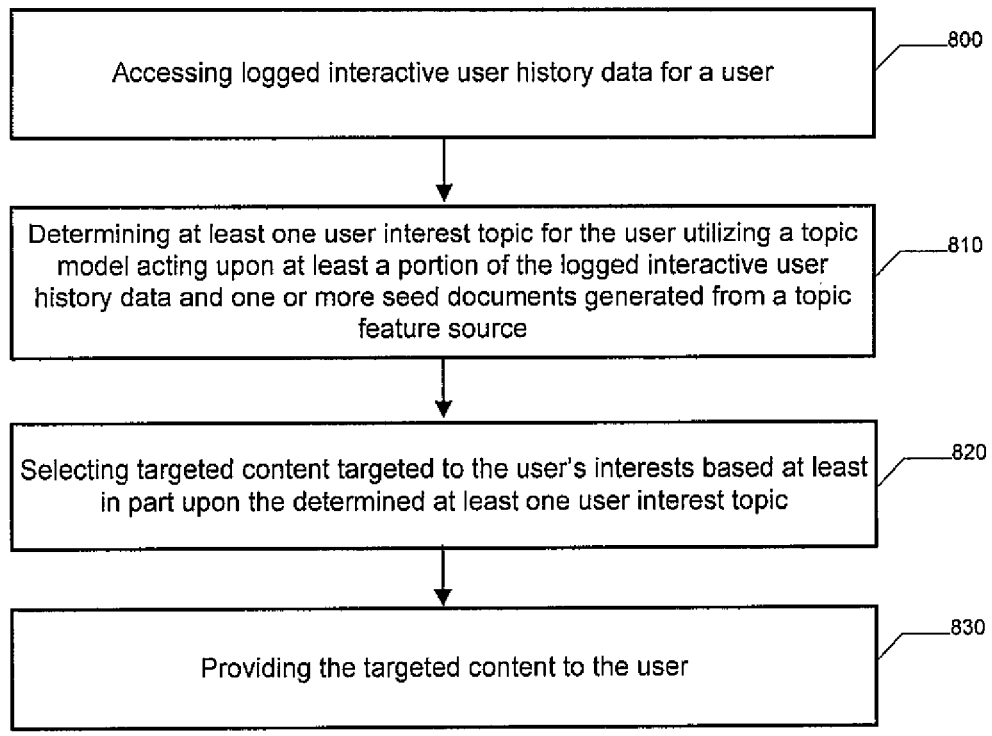
FIG. 8 illustrates a flowchart according to an example method for user interest modeling according to an example embodiment of the invention.

FIG. 8 illustrates a flowchart according to an example method for user interest modeling according to an example embodiment of the invention. The operations illustrated in and described with respect to FIG. 8 may, for example, be performed by and/or under the control of the interest modeling circuitry 218. Operation 800 may comprise accessing logged interactive user history data for a user. Operation 810 may comprise determining at least one user interest topic for the user utilizing a topic model acting upon at least a portion of the logged interactive user history data and one or more seed documents generated from a topic feature source. The topic model may, for example, comprise a labeled latent Dirichlet allocation with topic feature algorithm. Operation 820 may comprise selecting targeted content targeted to the user's interests based at least in part upon the determined at least one user interest topic. Operation 830 may comprise providing the targeted content to the user.

FIG. 8 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., an apparatus 202) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to service providers, content providers, computing devices and computing device users. Embodiments of the invention provide for the determination of user interest topics defining a user's interests. Embodiments of the invention facilitate leveraging determined user interest topics for providing targeted content, such as, for example, targeted advertising to users. In this regard, embodiments of the invention mine logged interactive user history data to determine user interest topics for a user. In accordance with some embodiments of the invention, the logged interactive user history data comprises data produced, received, and/or accessed by a user in the course of everyday use of a computing device.

As patterns of usage of a device by the user may reflect a user's interests, embodiments of the invention provide for statistical modeling of logged interactive user history data by way of a novel topic model configured to act upon one or more seed documents generated from a topic feature source. One such topic model provided by an embodiment of the invention is labeled latent Dirichlet allocation with topic feature (LLDA-TF) algorithm. In accordance with embodiments of the invention, predefined topic category labels comprising human readable and understandable names are determined through statistical modeling from logged interactive user history data. These predefined topic category labels provide more meaningful information about user interest topics than previous models, which merely provide a list of keywords representing a latent topic.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
accessing logged interactive user history data for a user; and
determining at least one user interest topic for the user utilizing a topic model acting upon at least a portion of the logged interactive user history data and one or more seed documents generated from a topic feature source, wherein determining at least one user interest topic for the user comprises:
assigning topic feature keywords of seed pages to predefined user interest topics, wherein each topic keyword is assigned to a first predefined user interest topic with a probabilistic percentage having a value less than 100% and is assigned to each remaining predefined user interest topic with a percentage defined by an equal distribution of the difference between 100% and the probabilistic percentage among remaining predefined user interest topics;
mixing the seed pages with the logged interactive user history data;
performing sampling to evaluate a posterior distribution of the predefined user interest topics; and
determining at least one user interest topic for the user based at least in part upon the evaluated posterior distribution of the predefined user interest topics.

2. The method according to claim 1, wherein determining at least one user interest topic comprises determining at least one predefined topic category label.

3. The method according to claim 1, wherein the topic model comprises a labeled latent Dirichlet allocation with topic feature model.

4. The method according to claim 1, wherein the topic feature source comprises an online encyclopedia, and wherein names of user interest topics are at least partially defined by titles of articles within the encyclopedia.

5. The method according to claim 1, further comprising:
accessing a content document corresponding to a predefined user interest topic from the topic feature source;
extracting keywords from the accessed content document; and
generating a seed document comprising topic feature keywords corresponding to the extracted keywords and having a user interest topic at least partially defined by a title of the content document; and wherein the one or more seed documents acted upon by the topic model comprise the generated seed document.

6. The method according to claim 1, wherein the logged interactive user history data comprises one or more of web pages visited by the user, emails sent by the user, emails received by the user, text messages sent by the user, text messages received by the user, documents viewed by the user, documents edited by the user, instant messages sent by the user, or instant messages received by the user.

7. The method according to claim 1, further comprising:
extracting relevant data from the logged interactive user history data; and wherein
acting upon at least a portion of the logged interactive user history data comprises acting upon the extracted relevant data.

8. The method according to claim 7, wherein extracting relevant data from the logged interactive user history data comprises, for a user history document within the logged interactive user history data:
calculating a text density of a region of the user history document; and
extracting text from the region when the text density satisfies a predefined threshold density requirement.

9. The method according to claim 1, further comprising:
selecting targeted content targeted to the user's interests based at least in part upon the determined at least one user interest topic; and
providing the targeted content to the user.

10. The method according to claim 9, wherein the targeted content comprises advertising content.

11. An apparatus comprising at least one processor and at least one memory storing computer program code, wherein the at least one memory and stored computer program code are configured to, with the at least one processor, cause the apparatus to at least:
access logged interactive user history data for a user; and
determine at least one user interest topic for the user by utilizing a topic model acting upon at least a portion of the logged interactive user history data and one or more seed documents generated from a topic feature source, wherein determining at least one user interest topic for the user comprises:
assigning topic feature keywords of seed pages to predefined user interest topics, wherein each topic keyword is assigned to a first predefined user interest topic with a probabilistic percentage having a value less than 100% and is assigned to each remaining predefined user interest topic with a percentage defined by an equal distribution of the difference between 100% and the probabilistic percentage among remaining predefined user interest topics;
mixing the seed pages with the logged interactive user history data;
performing sampling to evaluate a posterior distribution of the predefined user interest topics; and
determining at least one user interest topic for the user based at least in part upon the evaluated posterior distribution of the predefined user interest topics.

12. The apparatus according to claim 11, wherein the at least one memory and stored computer program code are configured to, with the at least one processor, cause the apparatus to determine at least one user interest topic by determining at least one predefined topic category label.

13. The apparatus according to claim 11, wherein the topic model comprises a labeled latent Dirichlet allocation with topic feature model.

14. The apparatus according to claim 11, wherein the topic feature source comprises an online encyclopedia, and wherein names of user interest topics are at least partially defined by titles of articles within the encyclopedia.

15. The apparatus according to claim 11, wherein the at least one memory and stored computer program code are configured to, with the at least one processor, further cause the apparatus to:
access a content document corresponding to a predefined user interest topic from the topic feature source;
extract keywords from the accessed content document; and
generate a seed document comprising topic feature keywords corresponding to the extracted keywords and having a user interest topic at least partially defined by a title of the content document; and wherein the one or more seed documents acted upon by the topic model comprise the generated seed document.

16. The apparatus according to claim 11, wherein the logged interactive user history data comprises one or more of web pages visited by the user, emails sent by the user, emails received by the user, text messages sent by the user, text messages received by the user, documents viewed by the user, documents edited by the user, instant messages sent by the user, or instant messages received by the user.

17. The apparatus according to claim 11, wherein the apparatus comprises or is embodied on a mobile phone, the mobile phone comprising user interface circuitry and user interface software stored on one or more of the at least one memory; wherein the user interface circuitry and user interface software are configured to:
- facilitate user control of at least some functions of the mobile phone through use of a display; and
- cause at least a portion of a user interface of the mobile phone to be displayed on the display to facilitate user control of at least some functions of the mobile phone.

18. The apparatus according to claim 11, wherein the at least one memory and stored computer program code are configured to, with the at least one processor, further cause the apparatus to:
- extract relevant data from the logged interactive user history data; and wherein
- acting upon at least a portion of the logged interactive user history data comprises acting upon the extracted relevant data.

19. The apparatus according to claim 18, wherein the at least one memory and stored computer program code are configured to, with the at least one processor, cause the apparatus to extract relevant data from the logged interactive user history data at least in part by, for a user history document within the logged interactive user history data:
- calculating a text density of a region of the user history document; and
- extracting text from the region when the text density satisfies a predefined threshold density requirement.

20. The apparatus according to claim 11, wherein the at least one memory and stored computer program code are configured to, with the at least one processor, further cause the apparatus to:
- select targeted content targeted to the user's interests based at least in part upon the determined at least one user interest topic; and
- provide the targeted content to the user.

21. The apparatus according to claim 20, wherein the targeted content comprises advertising content.

22. A computer program product comprising at least one non-transitory computer-readable storage medium having computer-readable program instructions stored therein, the computer-readable program instructions comprising:
- program instructions configured to access logged interactive user history data for a user; and
- program instructions configured to determine at least one user interest topic for the user by utilizing a topic model acting upon at least a portion of the logged interactive user history data and one or more seed documents generated from a topic feature source, wherein determining at least one user interest topic for the user comprises:
- assigning topic feature keywords of seed pages to predefined user interest topics, wherein each topic keyword is assigned to a first predefined user interest topic with a probabilistic percentage having a value less than 100% and is assigned to each remaining predefined user interest topic with a percentage defined by an equal distribution of the difference between 100% and the probabilistic percentage among remaining predefined user interest topics;
- mixing the seed pages with the logged interactive user history data;
- performing sampling to evaluate a posterior distribution of the predefined user interest topics; and
- determining at least one user interest topic for the user based at least in part upon the evaluated posterior distribution of the predefined user interest topics.

\* \* \* \* \*